(12) United States Patent
Frankel et al.

(10) Patent No.: US 6,283,625 B2
(45) Date of Patent: Sep. 4, 2001

(54) APPARATUS TO HEAT AND FROTH MILK UTILIZING COUNTER ROTATING MESH TABS PADDLES

(75) Inventors: Stephen W. Frankel, 909 Via Mirada, Palos Verdes Estates, CA (US) 90274; Robert M. Fey, Anaheim Hills, CA (US)

(73) Assignee: Stephen W. Frankel, Palos Verdes, CA (US)

( * ) Notice: Subject to any disclaimer, the term of this patent is extended or adjusted under 35 U.S.C. 154(b) by 0 days.

(21) Appl. No.: 09/352,377

(22) Filed: Jul. 13, 1999

(51) Int. Cl.$^7$ .............................. A47J 43/046; B01F 3/04; B01F 7/20
(52) U.S. Cl. ............................ 366/146; 366/205; 366/206; 366/296; 366/309; 366/314; 366/325.93; 366/328.2; 366/601
(58) Field of Search ................................. 366/146, 205, 366/206, 293, 294, 295, 296, 314, 325.93, 328.2, 328.3, 328.4, 601, 67, 309, 145; 99/348

(56) References Cited

U.S. PATENT DOCUMENTS

| | | | |
|---|---|---|---|
| 57,573 | * 8/1866 | Sanborn . | |
| 552,946 | * 1/1896 | Wikoff . | |
| 568,664 | * 9/1896 | Cripe . | |
| 751,187 | * 2/1904 | Lewiak . | |
| 912,852 | * 2/1909 | Johnson . | |
| 1,007,169 | * 10/1911 | Woodruff . | |
| 1,026,970 | * 5/1912 | Woodruff . | |
| 1,732,974 | * 10/1929 | Laney . | |
| 2,070,545 | * 2/1937 | Gilbert . | |
| 2,282,866 | * 5/1942 | Hagen . | |
| 2,752,123 | * 6/1956 | Deuschel et al. . | |
| 2,836,402 | * 5/1958 | Barnes et al. . | |
| 3,220,450 | * 11/1965 | Aronson, II et al. . | |
| 3,751,010 | 8/1973 | Latinen . | |
| 3,752,447 | 8/1973 | Chen . | |
| 3,921,961 | * 11/1975 | Hapgood | 366/309 |
| 4,083,653 | 4/1978 | Stiffler . | |
| 4,339,992 | 7/1982 | Kurland . | |
| 4,537,332 | 8/1985 | Brown et al. . | |
| 4,620,953 | 11/1986 | Silla et al. . | |
| 4,660,987 | * 4/1987 | Robinson | 366/67 |
| 4,802,407 | * 2/1989 | Negri et al. . | |
| 4,802,825 | 2/1989 | Hermans . | |
| 4,885,917 | * 12/1989 | Spector | 366/205 |
| 4,936,688 | 6/1990 | Cornell . | |
| 4,949,631 | 8/1990 | Fregnan . | |
| 4,960,042 | 10/1990 | Grossi . | |
| 5,031,518 | * 7/1991 | Bordes | 99/348 |
| 5,048,402 | * 9/1991 | Letournel et al. | 99/348 |
| 5,090,816 | 2/1992 | Socha . | |
| 5,151,199 | 9/1992 | Poulin et al. . | |
| 5,228,775 | * 7/1993 | Horn et al. | 366/309 |
| 5,335,588 | 8/1994 | Mahlich . | |
| 5,423,245 | 6/1995 | Midden . | |
| 5,464,574 | 11/1995 | Mahlich . | |
| 5,482,367 | 1/1996 | Khan et al. . | |
| 5,498,757 | 3/1996 | Johnson et al. . | |
| 5,580,169 | 12/1996 | Ghidini . | |
| 5,664,883 | 9/1997 | Tomassini . | |
| 5,676,889 | 10/1997 | Belgin . | |
| 5,738,002 | 4/1998 | Marano-Ducarne . | |
| 5,759,604 | 6/1998 | Bottlinger et al. . | |
| 5,780,087 | 7/1998 | Brady . | |
| 5,862,740 | 1/1999 | Grossi . | |
| 6,042,262 | * 3/2000 | Hajianpour | 366/601 |

* cited by examiner

*Primary Examiner*—Charles E. Cooley
(74) *Attorney, Agent, or Firm*—Blakely Sokoloff Taylor & Zafman

(57) ABSTRACT

The invention includes an apparatus to automatically heat and froth milk for beverages. The apparatus includes a container, a lower paddle group and upper paddle group located above the container bottom. Each paddle group includes at least two paddles. The lower paddle group is adapted to rotate in a direction that is counter to the rotation of the upper paddle group. The apparatus further includes a heater disposed firmly against and below the container bottom.

25 Claims, 10 Drawing Sheets

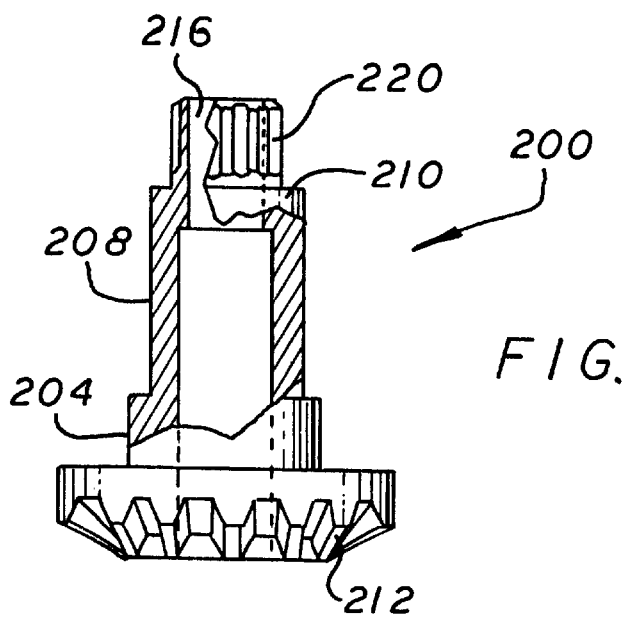
FIG. 7
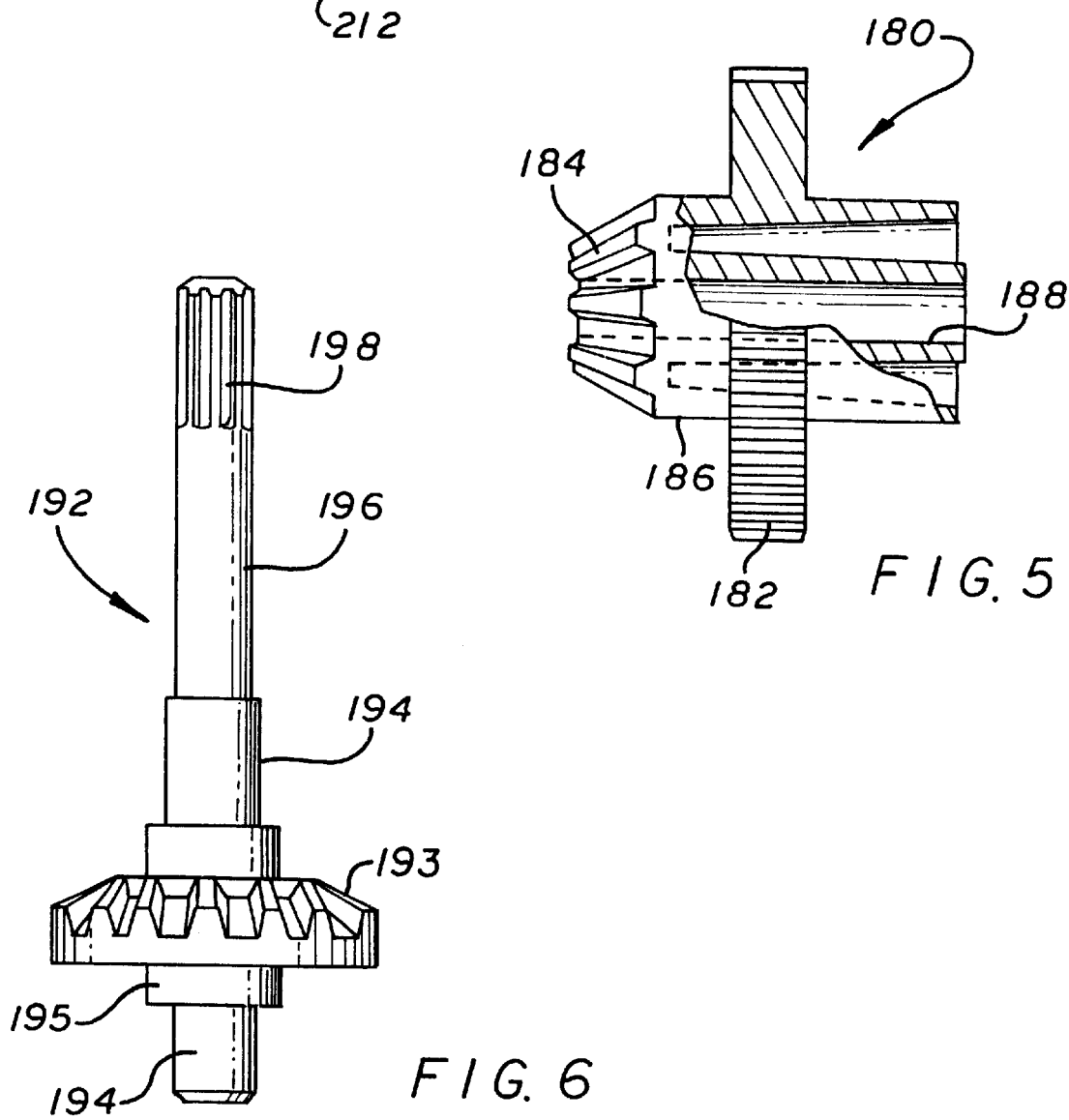
FIG. 5
FIG. 6

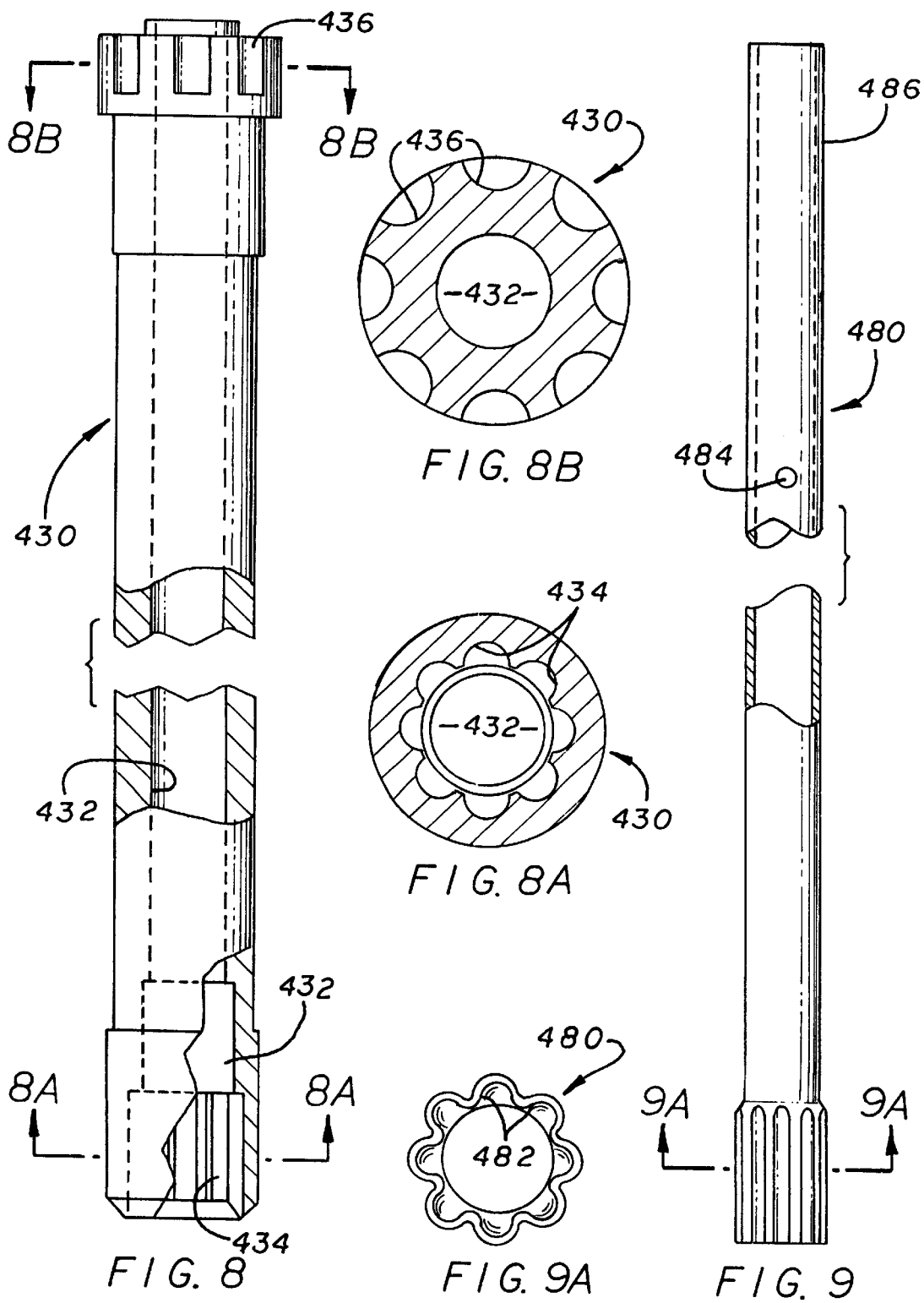

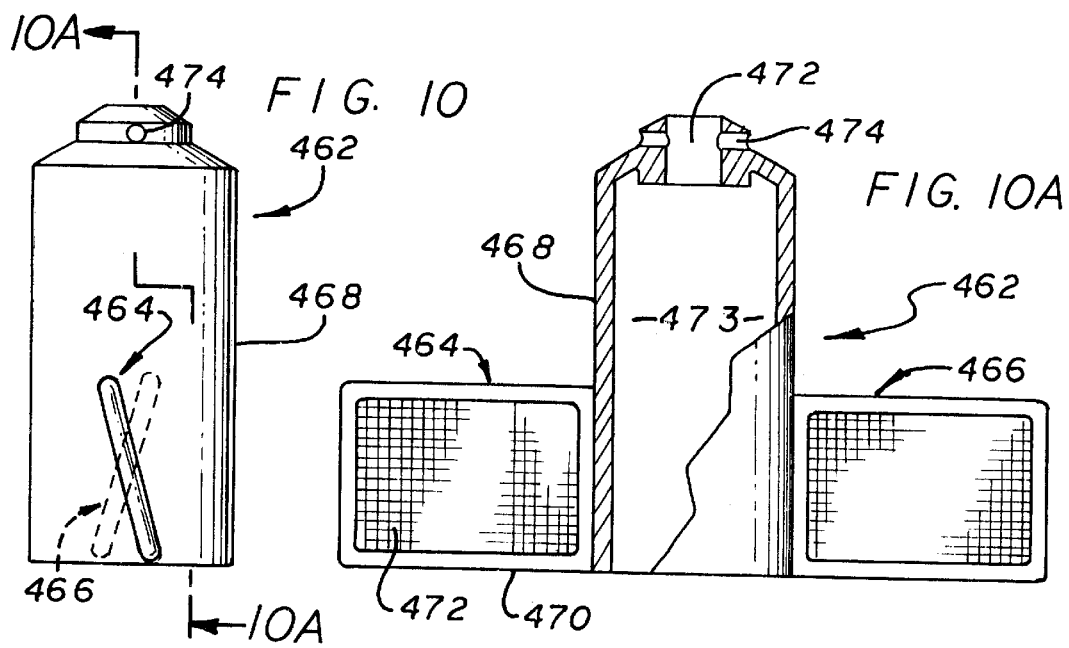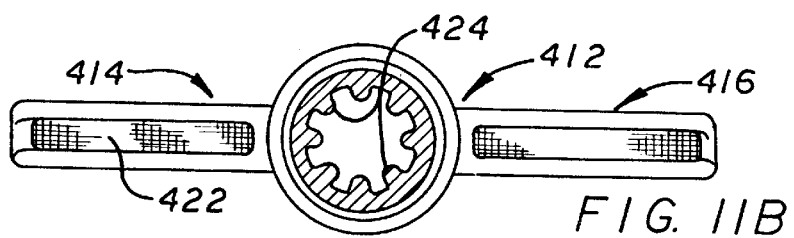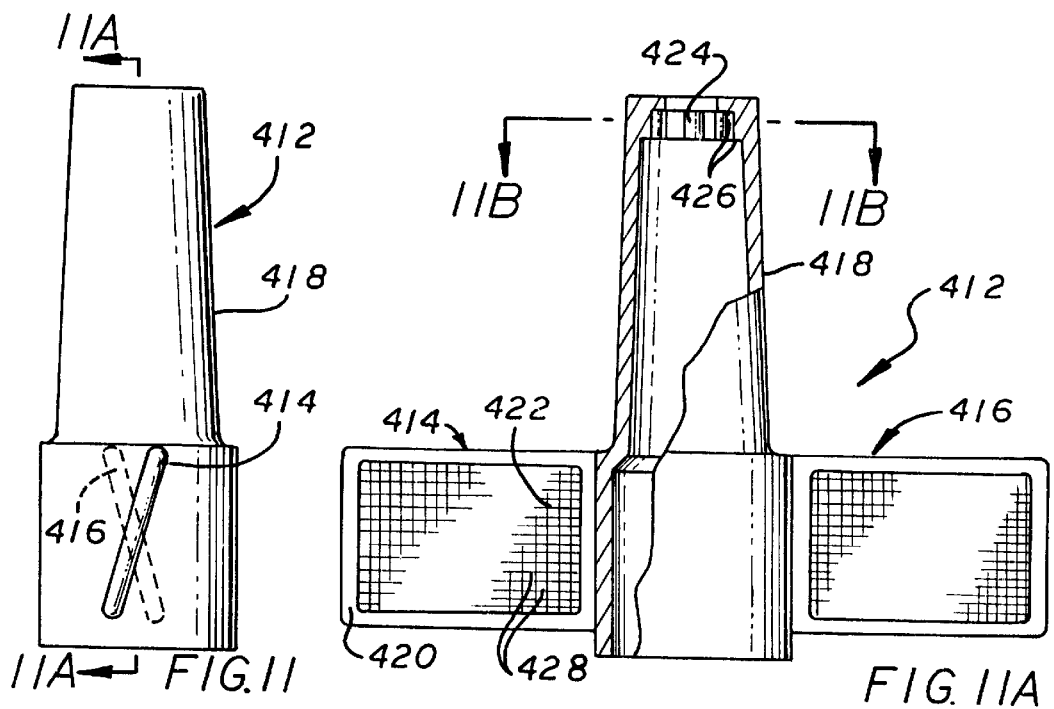

APPARATUS TO HEAT AND FROTH MILK UTILIZING COUNTER ROTATING MESH TABS PADDLES

BACKGROUND OF THE INVENTION

1. Field of the Invention

The invention relates to foaming or frothing a beverage such as milk for espresso type coffee drinks, hot chocolate, and the like by counter rotating paddles immersed within the milk where the paddles principally are formed of a screen or mesh.

2. Background Information

Espresso is strong coffee brewed by forcing steam under pressure through darkly roasted, finely ground coffee beans. This form of brewing can produce a thin layer of creamy, dark beige froth on the coffee's surface. Because Espresso is so strong, this rich, complex flavored beverage is served in a small two to three ounce cup known as a demitasse.

To quell the strong taste, some who partake in espresso add sugar. Alternatively, the espresso coffee may be mixed or topped with steamed milk or cream to form espresso based beverages such as cappuccinos, lattes, mochas and the like. The steamed milk forms a froth that adds flavor and texture to the espresso coffee as well as serves as a garnish. Espresso is popular in Europe whereas cappuccino and lattes have become popular in the United States.

Conventionally, the milk for espresso based beverages is warmed and frothed through superheated water vapors maintained at high pressure. A variety of machines have been patented, most seeking to overcome the inconsistent nature of steaming milk. See, for example, U.S. Pat. Nos. 4,960,042, 5,335,588, 5,423,245, 5,464,574, 5,738,002, and 5,862,740.

Generally, each steam producing espresso machine has a cavity in which water is turned to steam and placed under pressure. A valve-controlled steam wand is coupled to the cavity at one end and has a venturi jet at the other end. The wand extends from the machine and into a cup of milk. As the valve opens, the compressed steam expands as both water vapor and air into the milk. This rapidly raises the temperature of the fats in the milk and causes the milk to foam. The problem with this technique is that the water undesirably modifies the taste of the froth milk. Moreover, the quality of frothed milk is inconsistent from one application to another application.

There exists techniques to whip milk into a warm froth without the addition of hot water vapors. One technique is to direct the milk into a hard surface, thus causing the milk to rapidly change directions so as to expand into a froth. For example, U.S. Pat. No. 4,537,323 relates to an impeller having low vertical profile blade disposed within dairy based drinks where the impeller is driven at 4,000 Revolutions Per Minute (RPM) by external magnets. The high speed and low vertical profile of these blades forces the milk to rapidly change directions into surrounding air so as to produce fine, uniform bubbles within the milk. As another example, the device of U.S. Pat. No. 4,620,953 first heats milk through a heat exchanger and directs the hot milk through an adjustable-gap venturi into a stationary hole partially filled by cone. The cone provides an impact surface on which the milk impacts and rapidly changes direction. U.S. Pat. Nos. 4,949,631 and 5,759,604 operate similarly.

A technique to control a froth within a liquid without the addition of hot water vapors is to pass the liquid through stationary screens. For example, U.S. Pat. No. 5,151,199 teaches passing instant coffee through stationary screens to reduce the bubbles formed in instant coffee from large coarse bubbles to bubbles that comprise a fine, creamy froth. U.S. Pat. No. 5,738,002 teaches passing milk through a stationary frother nozzle having a plurality of holes that serve to aerate and cause frothing of the milk passing therethrough.

Another technique to whip milk into a warm froth without the addition of hot water vapors is to manually move coils, screens or meshes in a random or vertical direction through the milk. For example, U.S. Pat. No. 5,482,367 teaches manually rotating toroidal coils having a diameter range of 17 mm to 19 mm through milk using a hand whipping motion, much like hand beating eggs. U.S. Pat. Nos. 5,580, 169 and 5,780,087 each teach manually passing a screen attached to a plunger through milk in a vertical reciprocating motion. Each of the above mixtures may be pre-heated in a microwave oven.

For follow up reading, see Mathew Tekulsky et al., *Making Your Own Gourmet Coffee Drinks: Espressos, Cappuccinos, Lattes, Mochas, and More*! (Crown Pub., January 1993); *Espresso Coffee: The Chemistry of Quality* (Andrea Illy & Rinantonio Viani Eds., Academic Pr., October 1995); David C. Schomer, *Espresso Coffee: Professional Techniques* (Peanut Butter Pub., June 1996); Howard Schultz & Dori Jones Yang, *Pour Your Heart into It: How Starbucks Built a Company One Cup at a Time* (Hyperion, September 1997); Phillip Janssen, *Espresso Quick Reference Guide* (Eightball Books, September 1998); and Christie Katona & Thomas Katona, *Cappuccino/Espresso: The Book of Beverages* (Bristol Pub. Enterprises, March 1999).

SUMMARY OF THE INVENTION

The invention relates to an automatic beverage frother. The beverage frother includes a lower housing assembly having a motor coupled to a gear train. The gear train may be removeably coupled to an upper paddle group and a lower paddle group disposed within a container. Each paddle group rotates about the longitudinal axis of the container in opposite directions. Within each paddle group is at least one paddle where each paddle is formed of a frame having a mesh disposed within the frame. Other embodiments are disclosed.

BRIEF DESCRIPTION OF THE DRAWINGS

FIG. 5 illustrates the details of dual gear 180;

FIG. 6 illustrates upper paddle group drive 192;

FIG. 7 illustrates lower paddle group drive 200;

FIG. 8 illustrates lower drive tube 430;

FIG. 8A is a section view of internal pockets 434 taken off of line 8A—8A of FIG. 8;

FIG. 8B is a section view of external pockets 436 taken off of line 8B—8B of FIG. 8;

FIG. 9 illustrates upper drive tube 480;

FIG. 9A is a section view of internal pockets 482 taken off of line 9A—9A of FIG. 9;

FIG. 10 is a side view of upper impeller 462;

FIG. 10A is a sectional side view of upper impeller 462 taken generally off of line 10A—10A of FIG. 10;

FIG. 11 illustrates a side view of lower drive tube 430;

FIG. 11A is a sectional side view of lower impeller 412 taken generally off of line 11A—11A of FIG. 11;

FIG. 11B is a top view of lower impeller 412 taken generally off of line 11B—11B of FIG. 11A;

DETAILED DESCRIPTION OF THE INVENTION

In the following description, numerous specific details are set forth such as specific materials, processing steps, processing parameters, etc., in order to provide a thorough understanding of the invention. One skilled in the art will recognize that these details need not be specifically adhered to in order to practice the claimed invention. In other instances, well known processing steps, materials, etc., are not set forth in order not to obscure the invention. A patent need not teach, and preferably omits, what is well known in the art.

Figure 1:
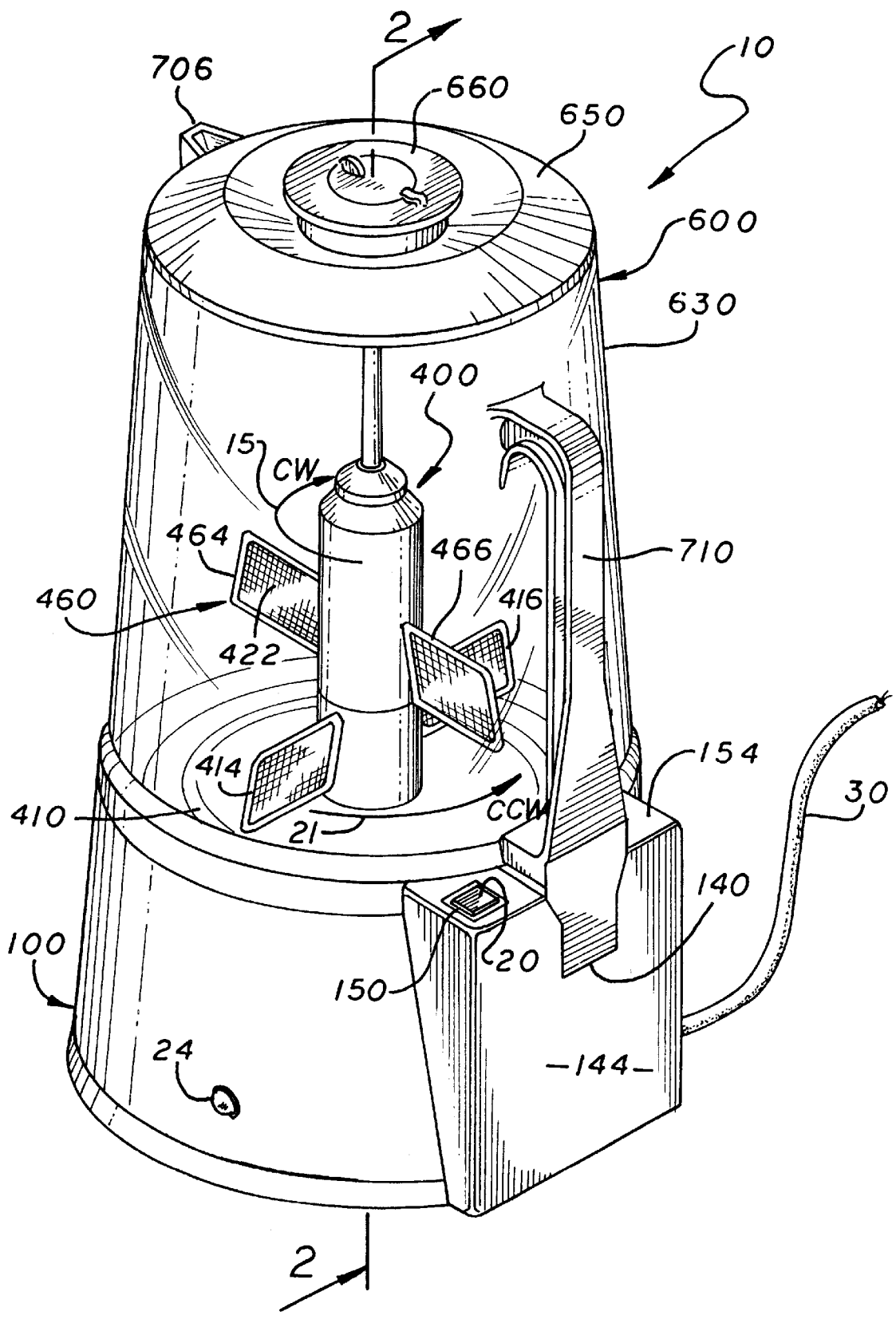
FIG. 1 is an isometric view of frother 10 showing housing assembly 100 supporting container assembly 600 and having impeller assembly 400 disposed therewithin.

FIG. 1 is an isometric view of frother 10 showing housing assembly 100 supporting container assembly 600 and having impeller assembly 400 disposed therewithin. In the preferred embodiment, liquid to be mixed (not shown) is added into container 630 and pushbutton switch 20 is activated such that light bulb 24 glows red. The red glow of light bulb 24 indicates that power is supplied through power cord 30 to heater 610 (FIG. 2) and motor 160 (FIG. 2) so that the liquid is heated and agitated.

Preferably, lower paddle group 410 of impeller assembly 400 moves counter clockwise as shown in FIG. 1 by arrow 21 while upper paddle group 460 moves clockwise as shown by arrow 15. As lower paddle group 410 moves counter clockwise, the liquid is forced radailly outward and up the inside surface of container 630. Under power, lower lead paddle 414 and lower follow paddle 416 attempt to form a parabola out of the mixing liquid through their rotation and angular orientation. As this occurs, the opposite-rotating, upper lead paddle 464 and upper follow paddle 466 force the liquid rising along the inside surface of container 630 back down into the rotating lower paddle group 410. This works to compel the liquid and each mesh 422 through one another so as to quickly generate a very warm, rich, thick, beautiful froth. It is this froth that may be used in drinks such as espresso based beverages, other coffee based beverages, and chocolate based beverages such as hot chocolate. The use of froth made from various liquids is a function of the application as well as the user's imagination.

Figure 2:
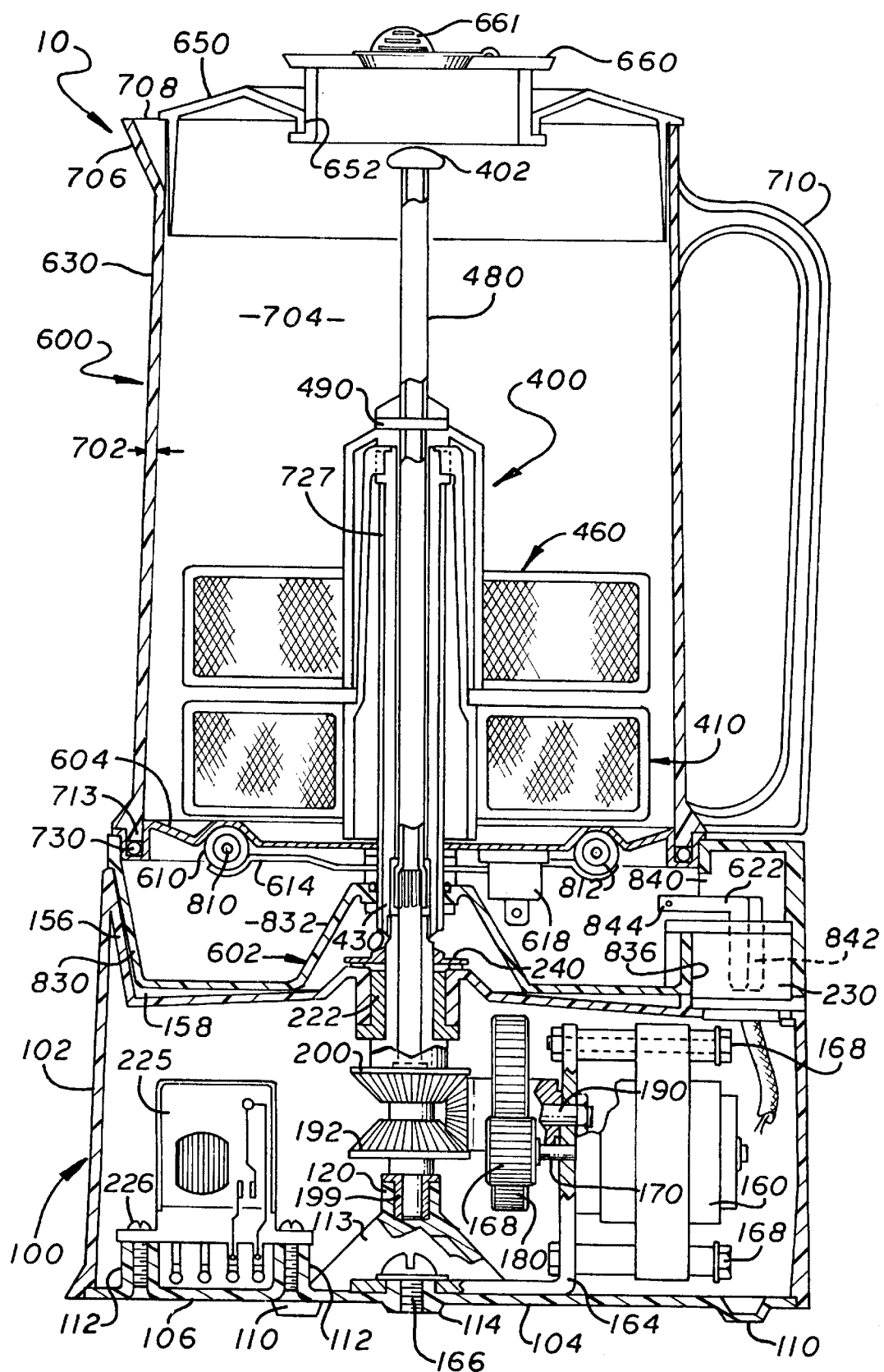
FIG. 2 is a section view of frother 10 taken off of line 2—2 of FIG. 1.

FIG. 2 is a section view of frother 10 taken off of line 2—2 of FIG. 1. In operation, container assembly 600 may be physically detached from systems housing 102 at the location where heater housing 602 joins systems housing 102. By lifting up on handle 710 of container assembly 600, container assembly 600 is separated from systems housing 102. Along with system bottom 104, systems housing 102 encloses the mechanical and electrical systems support for frother 10. In one embodiment, container assembly 600 is fixed to lower housing assembly 100 such that lifting up on handle 710 of container assembly 600 raises container assembly 600 and systems housing 102.

Figure 3A:
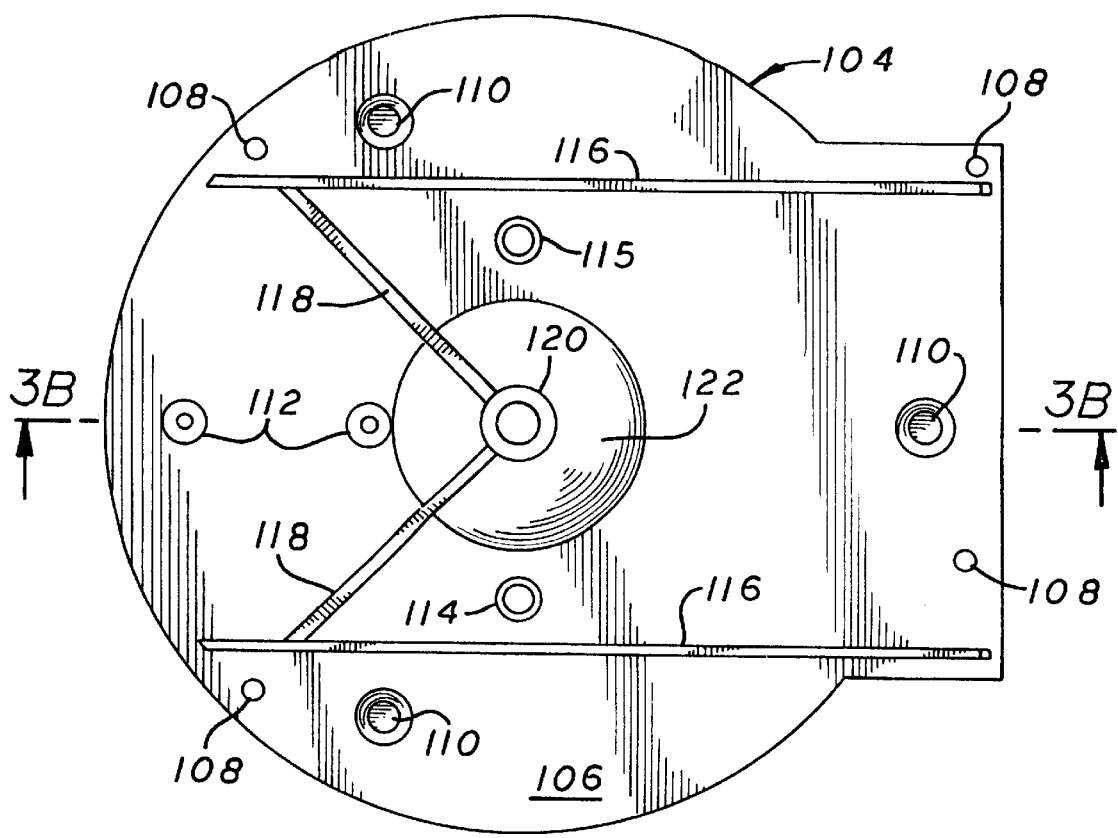
FIG. 3A is a top view of system bottom 104 of housing assembly 100 shown in FIG. 2.
Figure 3B:
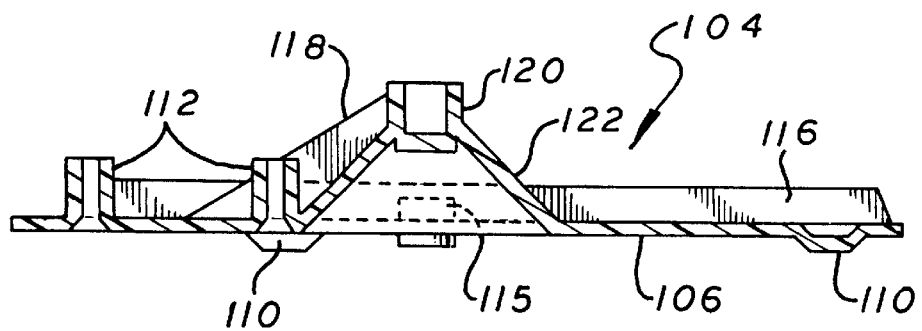
FIG. 3B is a side section view of system bottom 104 taken generally off of line 3B—3B of FIG. 3A.

FIG. 3A is a top view of system bottom 104 of housing assembly 100 shown in FIG. 2. FIG. 3B is a side section view of system bottom 104 taken generally off of line 3B—3B of FIG. 3A. As seen in FIG. 3A and FIG. 3B, system bottom 104 has a variety of features molded into its shape on which to mount the mechanical and electrical components of frother 10. Base 106 serves to support each of these features. Four housing holes 108 are formed into base 106, each of which aids in mounting systems housing 102 (FIG. 4B) to base 106.

Extending below base 106 is foot 110. Each foot 110 works to stabilize frother 10. Preferably, there are three of foot 110 as seen in FIG. 3A. Extending above base 106 are relay bosses 112, bracket bosses 114 and 115, ribs 116, gussets 118, impeller boss 120, and cone 122. Ribs 116 extend along the long length of base 106 so as to help maintain the preferred flat shape of base 106. Cone 122 serves as a stable base on which to raise impeller boss 120. The primary function of impeller boss 120 is to keep impeller assembly 400 from moving in a horizontal direction. To add further structural support to impeller boss 120, two gussets 118 extend from impeller boss 120 along cone 122 to base 106. In FIG. 3B, bracket boss 115 is revealed in phantom lines behind cone 122.

Figure 4A:
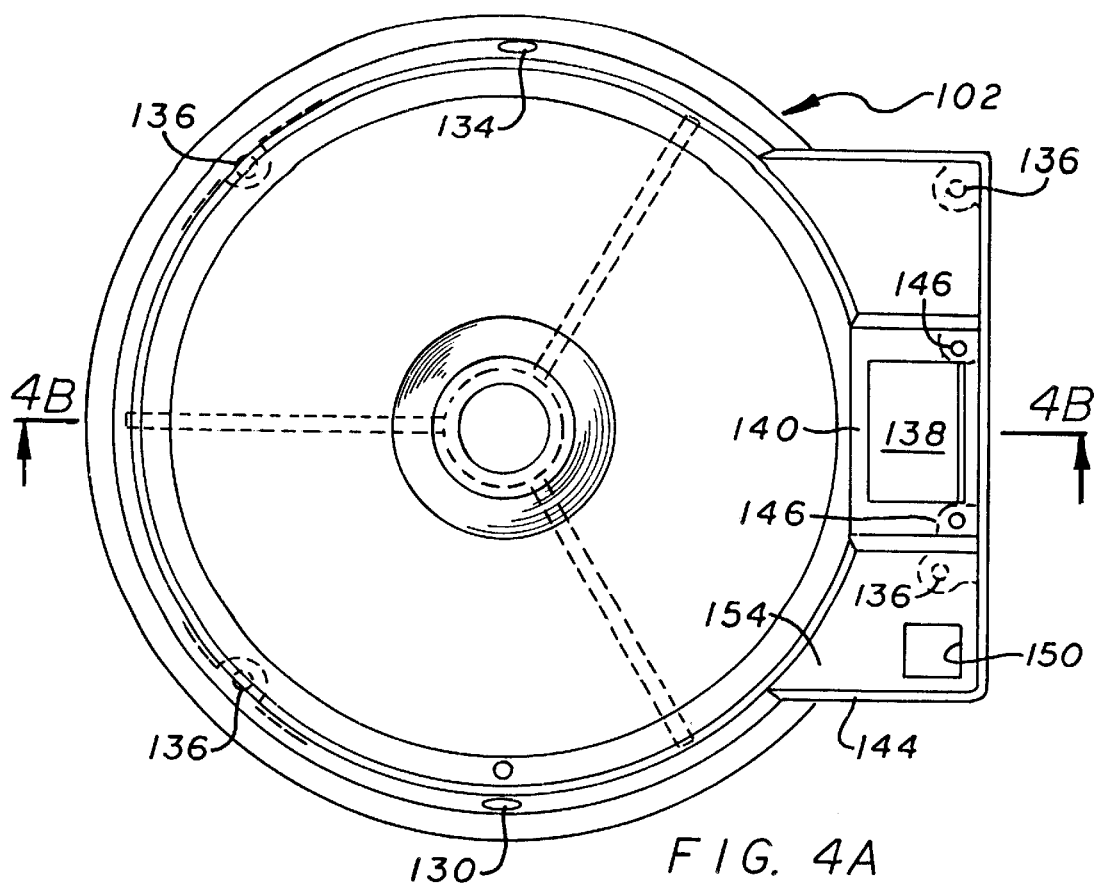
FIG. 4A is a top view of systems housing 102 seen in FIG. 2.
Figure 4B:
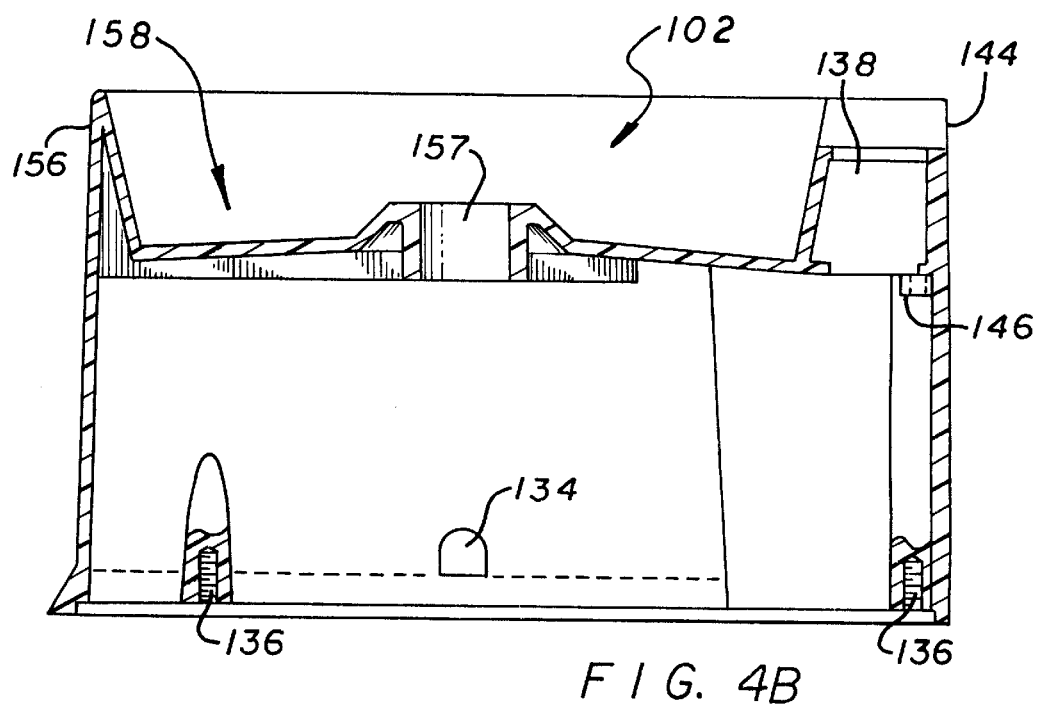
FIG. 4B is a side section view of systems housing 102 taken generally off of line 4B—4B of FIG. 4A.

FIG. 4A is a top view of systems housing 102 seen in FIG. 2. FIG. 4B is a side section view of systems housing 102 taken generally off of line 4B—4B of FIG. 4A. As seen in FIG. 4B, systems housing 102 is vertically elongated. This provides space for systems support such as mechanical and electrical components. Systems housing 102 also maintains access and mounting features.

Power cord hole 134 is formed into the location that is the polar opposite of light hole 130. Light hole 130 may receive light bulb 24 (FIG. 1) whereas power cord hole 134 provides a through access for power cord 30 (FIG. 1). Blind holes 136 of FIG. 4A and FIG. 4B aid in mounting system bottom 104 to systems housing 102 by receiving into the cavity of each blind hole 136, a thread forming screw that passes through a complementary housing hole 108 of system bottom 104.

Figure 14A:
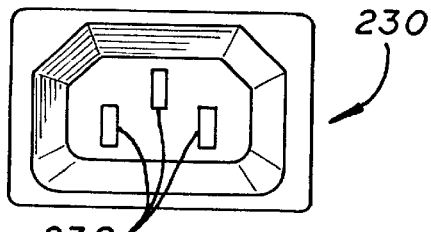
FIG. 14A is a top view of female connector 230, showing sockets 238.
Figure 14B:
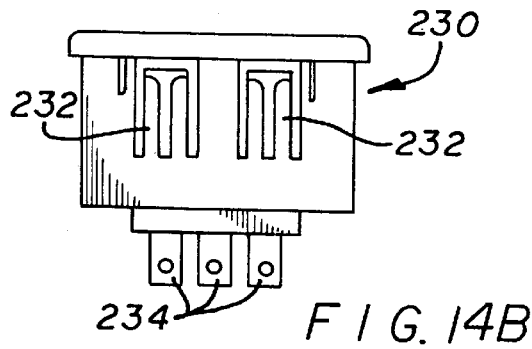
FIG. 14B is a side view of female connector 230, showing mounting pegs 232 and terminals 234.

Since heater 610 (FIG. 2) of container assembly 600 and its associated automatic switch 618 preferably detach from lower housing assembly 100 as container assembly 600 is lifted from lower housing assembly 100, mounting cutout 138 of FIG. 4A is formed into recessed portion 140 of block 144 to provide a location in which to place female connector 230 (FIG. 2, FIG. 14A, and FIG. 14B). Two peg bosses 146 of FIG. 4A aid in securing female connector 230 to systems housing 102. Other features of systems housing 102 include switch aperture 150, extension 156, and pipe 157. Switch aperture 150 is formed through the material supporting top surface 154 of block 144 whereas extension 156 forms container well 158. Pipe 157 permits the gear train of frother 10 to extend between systems housing 102. As shown in FIG. 2, upper bearing 222 may be press fit into pipe 157.

Referring back to FIG. 2, a variety of electrical and mechanical components are shown. Contained within systems housing 102 are motor 160, bracket 164, drive pinion 168, dual gear 180, upper paddle group drive 192, lower paddle group drive 200, relay 225, and female connector 230. As shown in FIG. 2, relay 225 may be mounted to relay bosses 112 with screws 226 at a position adjacent to lower paddle group drive 200. Relay 225 may be any device that responds to a small current or voltage change by activating switches or other devices in an electric circuit. Except for female connector 230, each of these components preferably are connected with system bottom 104.

To attach motor 160 to system bottom 104, an L-shaped bracket, such as bracket 164, is employed. Bracket 164 has two prongs that extend around cone 122 (FIG. 3A) of system bottom 104 so that each prong extends one through hole over complementary bracket boss 114 and one through hole over complementary bracket boss 115. Screws 166 (FIG. 2) are then inserted and tightened into bracket bosses 114 and 115. Motor 160 may be attached to bracket 164 by known hardware such as screws and spacers 168. Motor 160 may be a 2.5 inch diameter C-frame (shaded-Pole), 3000 RPM, 2 pole, Fasco Type 02, 1/400 to 1/25 horse power motor manufactured by Fasco Motors Group, St. Louis, Mo. Shaft 170 extends from motor 160 and rotates upon power being supplied to motor 160.

The rotation of shaft 170 may be transmitted to the paddles of frother 10 through a gear train. Drive pinion 168 is attached to shaft 170 to provide tooth-to-tooth transfer of power to dual gear 180. As shaft 170 rotates, so does drive pinion 168 and dual gear 180.

Drive pinion 168 may be thought of as a small cogwheel that engages a larger cogwheel. In this case, the larger cogwheel is driver gear 182 that forms part of dual gear 180. FIG. 5 illustrates the details of dual gear 180.

As shown in FIG. 5, dual gear 180 has two gears: driver gear 182 and bevel gear 184. Both driver gear 182 and bevel gear 184 are attached to shaft 186, where shaft 186 forms interior cavity 188 about the longitudinal axis of shaft 186. Driver gear 182 has a cylindrical profile that meshes with the smaller cylindrical profile of drive pinion 168. Bevel gear 184 is preferably a conical gear, that is to say, a gear in the shape of a cone. The conical shape of bevel gear 184 is preferred since this permits counter rotations at ninety degrees to shaft 186 of dual gear 180 within a confined space.

Dual gear 180 not only needs to be mounted in relation to drive pinion 168, but mounted so as to be freely subject to the rotation of drive pinion 168. To accomplish this rotation, dual gear bearing 190 (FIG. 2) first is attached to bracket 164. Cavity 188 of dual gear 180 is then inserted over dual gear bearing 190 such that driver gear 182 meshes with drive pinion 168 as shown in FIG. 2.

Alternatively, lower impeller group 410 may be coupled to a motor where the rotational direction of the motor is changed after developing a liquid parabola so as to force the impeller through the parabola. This change may be made by a manual switch or made through a computer chip coupled to motor and programmed to change the motor directions either as a function of time, as a function of pressure against lower impeller group 410, or both. Experiments have shown that a less than ten second motor reverse time is too soon and more than a forty second motor reverse time is too long to create good froth. Thus, the rotational direction of the motor may be reversed at a point within each sequential time interval of ten and forty seconds. If the rotational direction were reversed after twelve seconds, the rotational direction of the motor may again be reversed at a point within the subsequent time interval of ten and forty seconds. Preferably, the motor direction is changed every twenty seconds.

The above described gear train is a preferred embodiment. However, the claims of this patent are not limited to the described gear train, but include any structure that translates electricity into rotation motion about a vertical axis. For example, the product CoCoMotion manufactured as model HC4 by Mr. Coffee of Cleveland, Ohio includes two opposing, low profile nubs fixed to one another and located at the base of a container where the nubs are driven about the longitudinal axis of the container by electrically powered magnets to make hot cocoa.

FIG. 6 illustrates upper paddle group drive 192. With dual gear 180 mounted in place, upper paddle group drive 192 may be installed. Shafts 194, 195, and 196 of upper paddle group drive 192 are concentric to one another and elongate upper paddle group drive 192 at various radial diameters. Gear drive 193 is fastened onto shaft 195, the largest diameter of the shafts. Gear drive 193 is a straight bevel gear whose teeth are arranged to mesh with the teeth of bevel gear 184 that is maintained as part of dual gear 180 (FIG. 5). At the end of shaft 196 of FIG. 6 is external gear 198. External gear 198 is an elongated gear whose teeth are directed radially outward from the longitudinal axis of upper paddle group drive 192. Preferably, upper paddle group drive 192 is made from a molded plastic such as delrin.

To install upper paddle group drive 192, lower bearing 199 of FIG. 2 is press fit into impeller boss 120. Shaft 194 of upper paddle group drive 192 may then be arranged into lower bearing 199 so that the teeth of gear drive 193 (FIG. 6) mesh with the teeth of bevel gear 184 (FIG. 5). Preferably made of a polytetrafloroethylene based plastic, lower bearing 199 stabilizes the orbit of upper paddle group drive 192 while minimizing the friction between these two elements.

In part, upper paddle group drive 192 preferably resides concentric to, and coaxial with, lower paddle group drive 200. FIG. 7 illustrates lower paddle group drive 200. Shafts 204, 208, and 210 of lower paddle group drive 200 are concentric to one another and elongate lower paddle group drive 200 at various radial diameters. Gear drive 212 is fastened onto shaft 204, the widest diameter of the shafts. Gear drive 212 is a straight bevel gear whose teeth are arranged to mesh with the teeth of bevel gear 184 that is maintained as part of dual gear 180 (FIG. 5). At the end of shaft 210 is external gear 220. External gear 220 is an elongated gear whose teeth are directed radially outward from the axis of lower paddle group drive 200. Bored through lower paddle group drive 200 is lumen 216. Lumen 216 is a hollow shaft whose internal diameter is greater than the diameter of shaft 196 of upper paddle group drive 192. Preferably, lower paddle group drive 200 is made from a molded plastic such as nylon. To install lower paddle group drive 200, lumen 216 is placed about shaft 196 of upper paddle group drive 192 so that the teeth of gear drive 212 mesh with the teeth of bevel gear 184.

Upper paddle group drive 192 is responsible for rotating upper paddle group 460 in the clockwise direction while lower paddle group drive 200 is responsible for rotating lower paddle group 410 in the counter clockwise direction. By positioning gear drive 193 and gear drive 212 at each end of a diameter of bevel gear 184, both upper paddle group drive 192 and lower paddle group drive 200 rotate at similar revolutions per minute but in opposite directions. These counter rotations are translated to paddle groups 460 and 410 so that paddle groups 460 and 410 rotate in opposite directions.

Preferably, upper paddle group 460 and lower paddle group 410 rotate about the longitudinal axis of container 630 along a circular path. This path may be other than circular, such as elliptical or random. Moreover, the path may vary out of plane and in each vertical direction.

To couple the rotation of upper paddle group drive 192 and lower paddle group drive 200 to their respective paddle groups, extension tubes are preferably employed. FIG. 8 illustrates lower drive tube 430 and FIG. 9 illustrates upper drive tube 480. Lower drive tube 430 of FIG. 8 includes hollow portion 432, internal pockets 434, and external pockets 436.

Hollow portion 432 permits mechanical coupling of upper paddle group drive 192 (FIG. 2) to upper paddle group 460 through upper drive tube 480 of FIG. 9. FIG. 8A is a section view of internal pockets 434 taken off of line A—A of FIG. 8 and FIG. 8B is a section view of external pockets 436 taken off of line B—B of FIG. 8. Internal pockets 434 are complementary to external gears 220 (FIG. 7) of lower paddle group drive 200, and external pockets 436 are complementary to internal gears 424 (FIG. 11B) of lower impeller 412.

As noted, FIG. 9 illustrates upper drive tube 480. Upper drive tube 480 includes internal pockets 482, pin hole 484, and cap end 486. FIG. 9A is a section view of internal pockets 482 taken off of line A—A of FIG. 9. Internal pockets 482 are complementary to external gears 198 (FIG. 6) of upper paddle group drive 192.

Upper paddle group 460 of FIG. 2 comprises upper impeller 462 and upper drive tube 480. FIG. 10 is a side view of upper impeller 462. FIG. 10A is a sectional side view of upper impeller 462 taken generally off of line A—A of FIG. 10. As seen in FIG. 10A, upper impeller 462 includes lead paddle 464, follow paddle 466, and shaft 468.

Lead paddle 464 includes frame 470 into which mesh 472 may be formed. Shaft 468 shown in FIG. 10A preferably is a hollow tube having lumen 473, lumen 472, and pin hole 474. Lumen 472 preferably has a smaller diameter than lumen 473. Upper impeller 462 is formed by attaching lead paddle 464 and follow paddle 466 to shaft 468, preferably angled as shown in FIG. 10 so that liquid is forced down as upper impeller 462 rotates.

Lower paddle group 410 of FIG. 2 comprises lower impeller 412 and lower drive tube 430. FIG. 11 illustrates a side view of lower drive tube 430. FIG. 11A is a sectional side view of lower impeller 412 taken generally off of line A—A of FIG. 11. FIG. 11B is a top view of lower impeller 412 taken generally off of line B—B of FIG. 11A.

As best seen in FIG. 11A, lower impeller 412 includes lead paddle 414, follow paddle 416, and shaft 418. Lead paddle 414 and follow paddle 416 preferably have a similar construction. Lead paddle 414 includes frame 420 into which mesh 422 may be formed. Similar to frame 470, frame 420 of lead paddle 414 may lie within a single plane as shown in FIG. 11 or be curved, curled, angled and the like. Mesh 422 or mesh 472 may be any group of open spaces where each space is surrounded by material. The area of each open space 428 of mesh 422 (FIG. 11A) is to be large enough to permit fluid to pass through open space 428. The material has at least a first length and each open space 428 has at least a first length. The ratio of the first length of the material and the first length of an open space 428 may be one to one. This distance ratio of material measured in one direction to one open space 428 measured in one direction may also be two to one, one to two, or other decimal or whole number combinations so as to form a symmetrical or asymmetrical pattern.

In one embodiment, open spaces 428 are $\frac{1}{32}$ inch by $\frac{1}{32}$ inch squares, where the center of each open space 428 is located at a distance of $\frac{1}{16}$ inch from adjacent centers of open spaces 428. The internal perimeter contour of open space 428 may be square, round, oval, elongated, random, or any other contour that permits fluid to pass through open space 428. The relative centers of each open space 428 may be of a uniform pattern such as shown in FIG. 11A, of a random pattern, or a combination thereof. The internal perimeter contour of open space 428 may be straight, angled, curved, or any other shape that permits fluid to pass through open space 428.

Shaft 418 of FIG. 11A preferably is a hollow tube having internal gears 424 and registers 426 formed at a first end. internal gears 424 are best seen in FIG. 11B. Lower impeller 412 may formed by attaching lead paddle 414 and follow paddle 416 to shaft 418 at a second end. Preferably, lead paddle 414 and follow paddle 416 are mounted to shaft 418 in a manner that contributes to forcing the liquid down as lower impeller 412 rotates. In one embodiment, lead paddle 414 and follow paddle 416 are mounted to shaft 418 at an angle of fifteen degrees as shown in FIG. 11. Lead paddle 464 and follow paddle 466 of FIG. 10A preferably have constructions that are similar to lead paddle 414 and follow paddle 416 shown in FIG. 11A. Alternatively, these four paddles each may be of a distinct construction shape as well, or any combination thereof.

Referring back to FIG. 2, container assembly 600 includes port cap 660 having flavor hatch 661 where port cap 660 is disposed within port 652 of lid 650. Lid 650 fits within container 630. As shown in FIG. 2, wall thickness 702 preferably is continuous, but may vary, so as to define container interior 704. Spout 706 is formed as part of wall thickness 702 at upper end 708. On the opposing side of spout 706 is handle 710. By manipulating handle 710, liquid may flow out of container interior 704 over spout 706. Container 630 also includes lower end 713.

FIG. 2 also illustrates container bottom 604, which serves as the bottom of container 630. Container assembly 600 also includes heater housing 602 that may be formed from an injection molded plastic. Heater housing 602 serves to house heater 610 and provide a flat, stable bottom on which to rest container assembly 600. Wall 830 of heater housing 602 forms cavity 830, hole 834 (FIG. 12), male connector housing 836, and gap 840.

Figure 15:
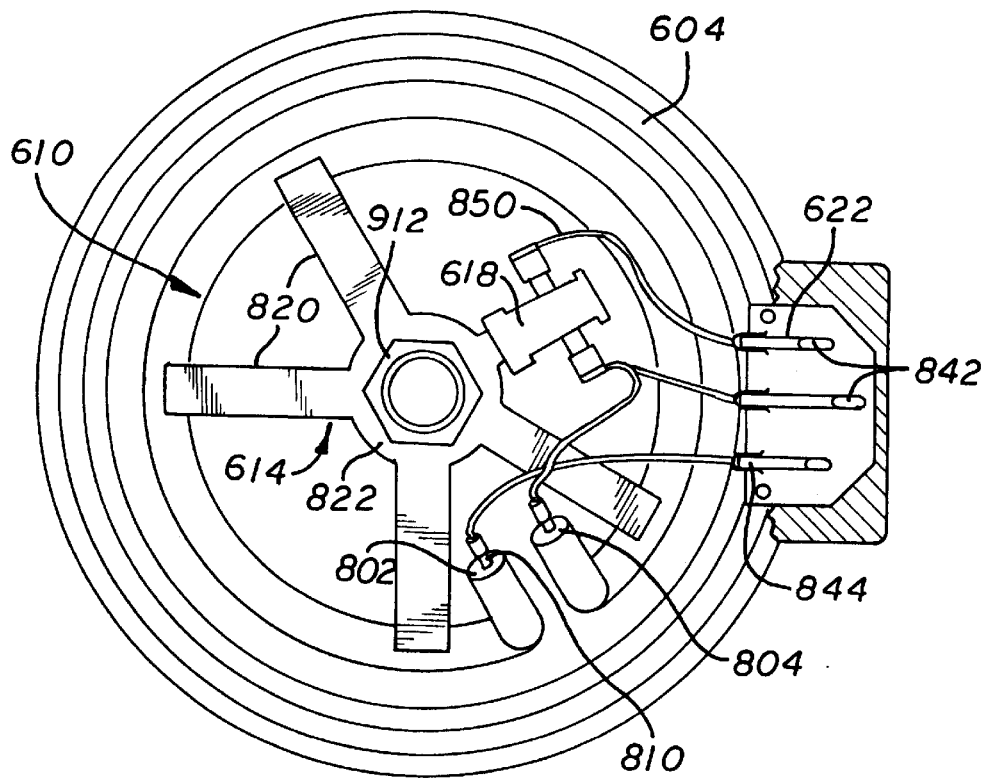
FIG. 15 illustrates the mechanical support and the wiring of heater 610 and automatic switch 618.

Heater housing 602 is initially prepared by inserting upper terminals 622 of FIG. 2 into male connector housing 836. Male prongs 842 of upper terminals 622 are complementary to sockets 238 (FIG. 14A) of female connector 230. Leads 844 of upper terminals 622 extend towards heater 610 and automatic switch 618 so that wires 850 (FIG. 15) may be installed to provide power to heater 610 and automatic switch 618 as shown in FIG. 15.

Figure 12:
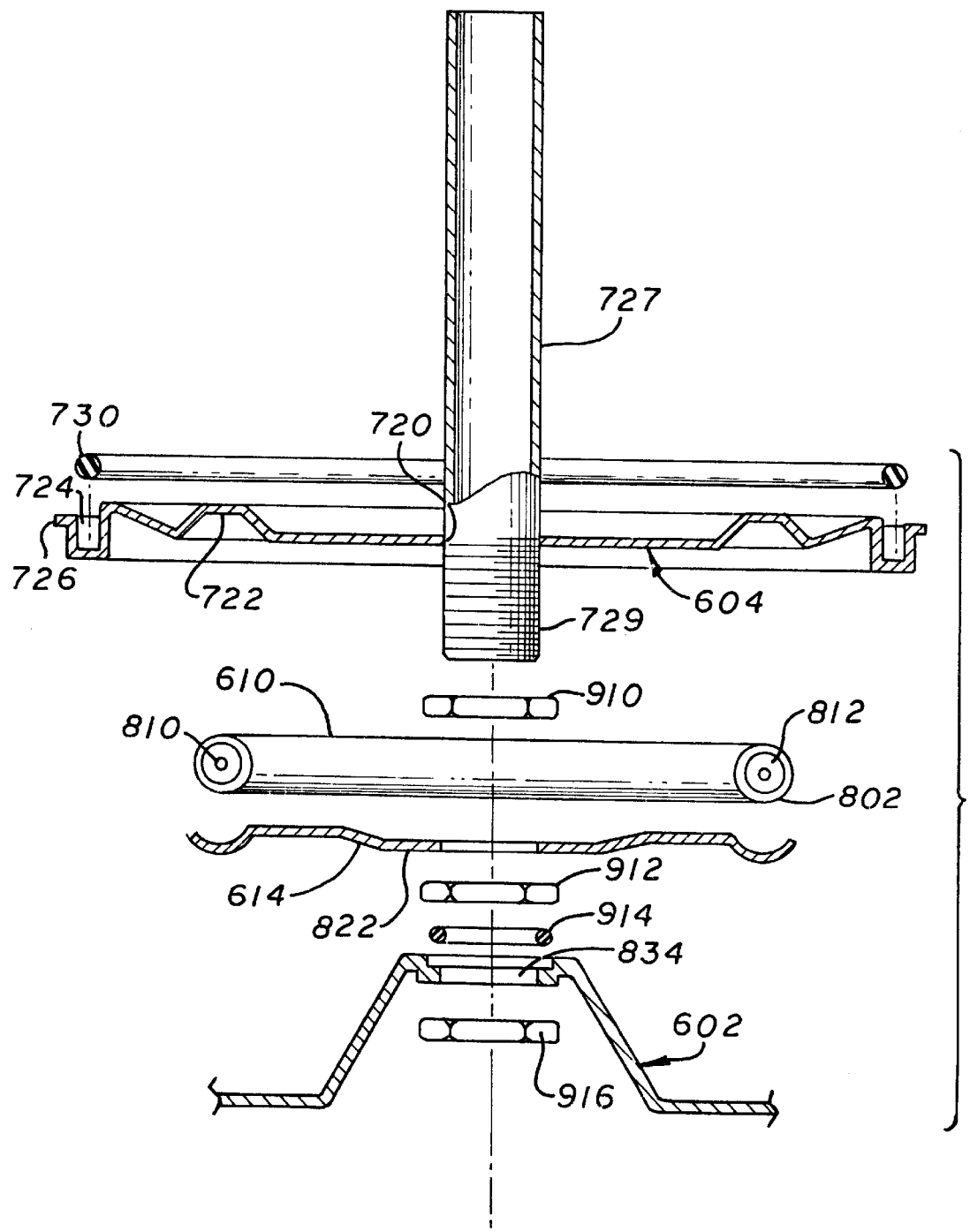
FIG. 12 illustrates a partial assembly of container assembly 600.

FIG. 12 illustrates a partial assembly of container assembly 600. The features of container bottom 604 as shown in FIG. 12 include hole 720, heater well 722, groove 724 and outer ring 726. Stand pipe 727 is an elongated tube fixed within hole 720, such as by welding, so as to form a water tight seal. Stand pipe 727 preferably is threaded at threaded end 729.

As shown in FIG. 12, o-ring 730 may be placed into groove 724. As shown in FIG. 2, groove 724 preferably is brought in contact with lower end 713 of container 630. To secure container bottom 604 to lower end 713 of container 630, outer ring 726 may be roll formed about lower end 713. Where the roll form process is sufficiently tight, o-ring 730 may not be needed. The compression of o-ring 730 between lower end 713 and groove 724 forms a watertight seal.

Referring back to FIG. 12, spacer nut 910 is placed about threaded end 729. Mounting spring 614 is used to hold heater 610 firmly against container bottom 604 by securing mounting spring 614 against spacer nut 912 with nut 912. Heater housing 602 is secured against nut 912 by placing o-ring 914 over hole 834, inserting threaded end 729 through hole 834, and tightening nut 916 about threaded end 729.

Heater 610 is used to heat the liquid within container 630 as the liquid is turned into a froth. As shown in FIG. 12, tube 802 is hollow and is formed into a circle in which free end 804 (FIG. 15) meets free end 806. Within tube 802 of FIG. 12 is wire 810 surrounded by insulator 812. Wire 810 may be any high resistant material such as nickel cadmium. As electricity is passed through wire 812, wire 812 radiates heat. Insulator 812 works to spread the concentrate heat from wire 810 to tube 802. Preferably, insulator 812 is made of gypsum and tube 802 is made of aluminum, steel, or copper.

Figure 13A:
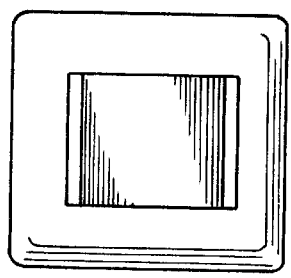
FIG. 13A is a top view of push button switch 20.
Figure 13B:
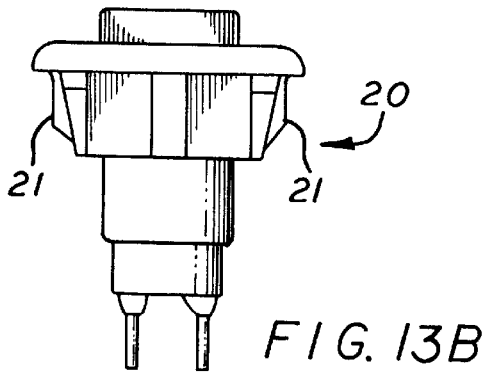
FIG. 13B is a side view of push button switch 20, showing snap fits 21.

Lower housing assembly 100 of FIG. 2 also includes push button switch 20. FIG. 13A is a top view of push button switch 20 and FIG. 13B is a side view of push button switch 20, showing snap fits 21. FIG. 14A is a top view of female connector 230, showing sockets 238 and FIG. 14B is a side view of female connector 230, showing mounting pegs 232 and terminals 234.

As shown in FIG. 1, pushbutton switch 20 is installed into switch aperture 150 (FIG. 4A) of block 144 of systems housing 102 by inserting pushbutton switch 20 so that snap fits 21 extend past top surface 154 of block 144 and through switch aperture 150 so as to snap into place. Female connector 230 is similarly installed. As shown in FIG. 1, mounting pegs 232 (FIG. 14B) are inserted into peg bosses (FIG. 4A) until female connector 230 is within mounting cutout 138 of recessed portion 140 (FIG. 4A). Light bulb 24 (FIG. 1) may then pressed into light hole 130 (FIG. 4A) to appear external to systems housing 102 as shown in FIG. 1.

FIG. 15 illustrates the mechanical support and the wiring of heater 610 and automatic switch 618. Mounting spring 614 of FIG. 15 preferably comprises five arms 820 that extend above the plain of their common hub 822 (FIG. 12) so that on installation, four of arms 820 are put into tension to apply compression against tube 802 of heater 610. The fifth arm 820 is put into tension to apply compression against automatic switch 618 as shown in FIG. 15. Where automatic switch 618 is a thermostat, the temperature detecting surface of the thermostat is held tight and flush against container bottom 604 as shown in FIG. 2. Thus, the thermostat is able to sense the temperature of the liquid inside container 630 as the heat from the liquid conducts through container bottom 604.

Automatic switch 618 may be used to trip and terminate the heating and frothing process upon reaching the desired temperature. Automatic switch 618 may be any device that automatically responds to temperature changes and activates switches controlling the equipment. Automatic switch 618 may also be a switch with an integral timer or a thermostat with a back up thermostat. Preferably, automatic switch 618 includes a temperature-sensitive bimetal disc that is used to actuate normally closed contacts so as to create an open in the electrical path of heater 610. At a predetermined temperature, automatic switch 618 shuts off heater 610. Phenolic automatic reset thermostat model 2450HR manufactured by Elmwood Sensors, Inc. of Providence R.I. may be used as automatic switch 618.

Wiring 850 connects leads 844 of upper terminals 622 having male prongs 842 to automatic switch 618 and heater 610. With wiring 850 in place, heater 610 is placed into heater well 722 (FIG. 12), automatic switch 618 is placed on arm 820 and mounting spring 614 is brought to bear against heater 610 by tightening nut 912 as shown in FIG. 15. Heater housing 602 of FIG. 12 may then be mounted to container bottom 604 using nut 916 sealed with o-ring 914 as shown in FIG. 12.

With the components in place, power cord 30 (FIG. 1) is wedged into power cord hole 134 (FIG. 4B). Wires from power cord 30 are attached to relay 225 of FIG. 2. Wires are distributed from relay 225 to the remainder electrical components. System bottom 104 may then be brought towards systems housing 102 so that shaft 210 (FIG. 7) of lower paddle group drive 200 is threaded through upper bearing 222 (FIG. 2). System bottom 104 is then pressed against systems housing 102 and held in place by thread forming screws placed through housing holes 108 (FIG. 3A) and tightened into blind holes 136 (FIG. 4A and FIG. 4B). Cap nut 240 of FIG. 2 may be placed about lower paddle group drive 200.

Included with impeller assembly 400 of FIG. 2 is knob 402, lower paddle group 410, and upper paddle group 460. Knob 402 is fixed in cap end 486 (FIG. 9) and permits a user of frother 10 to grasp and remove impeller assembly 400 from container assembly 600, such as when cleaning frother 10.

To assemble lower paddle group 410 of FIG. 2, lower drive tube 430 is placed within lower impeller 412 until external pockets 436 mesh engage internal gears 424 and lower drive tube 430 seats against registers 426 of FIG. 11A. To assemble upper paddle group 460 of FIG. 2, upper drive tube 480 is placed into lumen 472 (FIG. 10A) until pin hole 484 of upper drive tube 480 is aligned with pin hole 474 of upper impeller 462. Stainless steal roll pin 490 of FIG. 2 is then placed through both pin hole 474 and pin hole 484 to lock upper impeller 462 to upper drive tube 480. By inserting knob 402 into cap end 485 of upper drive tube 480 and inserting upper drive tube 480 into hollow portion 432 of lower drive tube 430, impeller assembly 400 of FIG. 2 is formed.

To complete container assembly 600, impeller assembly may be grasped at knob 402 disposed within upper drive tube as shown in FIG. 2, and placed in container interior 704. Lower drive tube 430 is inserted through stand pipe 727 of container bottom 604. Including lid 650 and port cap 660, container assembly 600 is now complete.

Frother 10 shown in FIG. 2 is assembled by bringing together heater housing 602 of container assembly 600 and container well 158 of lower housing assembly 100. This allows internal pockets 434 of lower drive tube 430 and internal pockets 482 to be inserted over the associate external gears of lower paddle group drive 200 and upper paddle group drive 192. The relationship between male prongs 842 of container assembly 600 and sockets 238 of female connector 230 is also consummated as container assembly 600 is placed on top of lower housing assembly 100.

Figure 16:
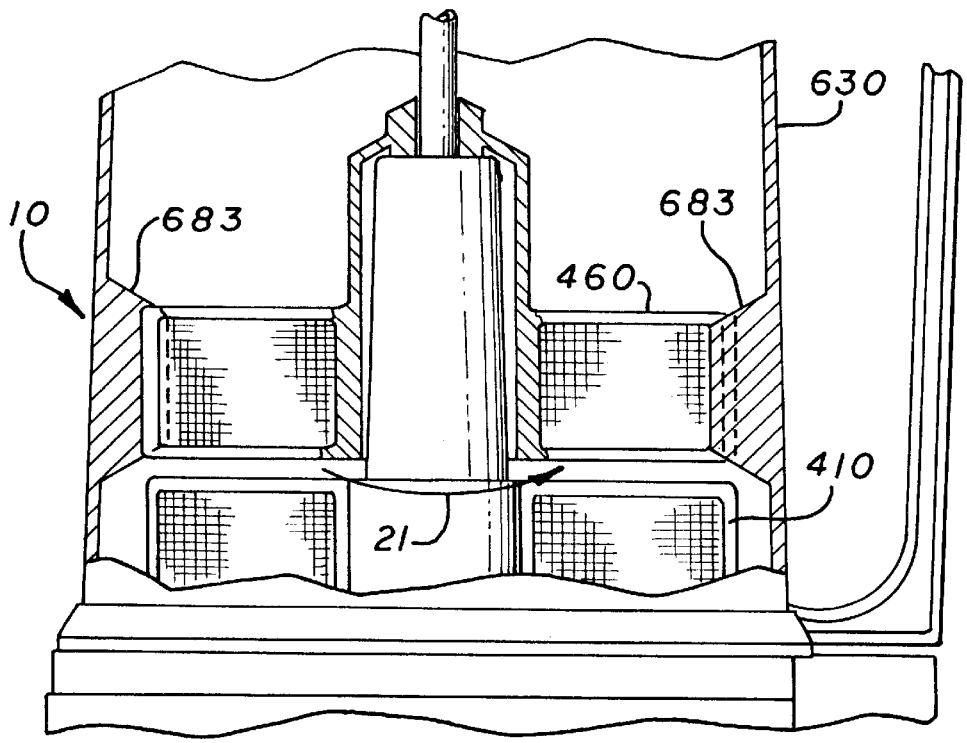
FIG. 16 is an isometric view of frother 10 showing upper paddle group 460 kept stationary as lower paddle group 410 rotates in the direction of arrow 21.

In an alternative embodiment, upper paddle group 460 may be kept fixed or stationary by, for example, container projections 683 as lower paddle group 410 rotates. FIG. 16 is an isometric view of frother 10 showing upper paddle group 460 kept stationary as lower paddle group 410 rotates in the direction of arrow 21. This may be thought of as lower paddle group 410 having a first rotated position and a second rotated position, wherein upper paddle group 460 is fixed in a position with respect to the first rotated position and the second rotated position. Fixed, angled, upper paddle group 460 also forces the liquid rising along the inside surface of container 630 back down into the rotating lower paddle group 410. In this embodiment, upper paddle group 460 is not coupled to upper paddle group drive 192.

Figure 17:
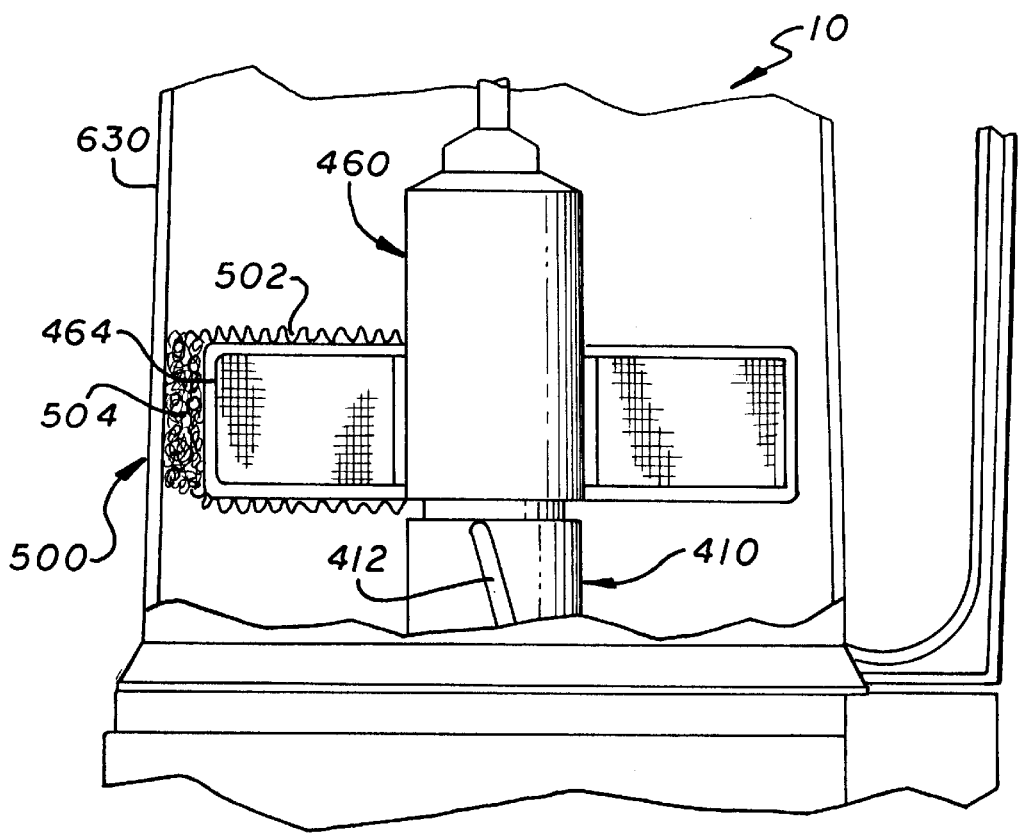
FIG. 17 illustrates that seal 500 may be comprised of coil spring 502 secured to lead paddle 464 and mesh screen 504.

To prevent liquid from traveling between a paddle and container 630, a seal may be employed on each paddle in an alternate embodiment. As illustrated in FIG. 17 for lead paddle 464, seal 500 may be comprised of coil spring 502 secured to lead paddle 464 and mesh screen 504. Coil spring 502 may be a continuous loop coil spring secured to the circumference of lead paddle 464. Mesh screen 504 is secured to lead paddle 464 by coil spring 502 so that, when impeller assembly 400 is placed within container 630, coil spring 502 compresses slightly, thereby forcing mesh screen 504 against the inside wall of container 630. Here, container 630 is preferably made out of glass to prevent container 630 from scratching as mesh screen 504 rubs against the inside of container 630. Alternatively, a rubber wiper may extend from each paddle to the inside of container 630.

The invention was tested using a stainless steel screen within a plastic frame for the paddles. Tests were run on serving sizes of both whole milk and skimmed milk. The results were as follows:

| TEST #1 - 1 Cup Whole Milk | | | |
|---|---|---|---|
| Average time | 3 min-30 sec. | Range 2'20" to 3'50" | 10 runs |
| Average froth | 429 ML. | Range 320 to 500 | 10 runs |
| Average milk | 160 ML. | Range 150 to 195 | 10 runs |
| TEST #2 - ½ Cup Whole Milk | | | |
| Average time | 2 min-25 sec. | Range 2'15" to 3'45" | 3 runs |
| Average froth | 130 ML. | Range 120 to 150 | 3 runs |
| Average milk | 65 ML. | Range 50 to 80 | 3 runs |
| TEST #3 - 1 Cup Skimmed Milk | | | |
| Average time | 2 min-20 sec. | Range 2'17" | 3 runs |
| Average froth | 580 ML. | Range 500 to 650 | 3 runs |
| Average milk | 150 ML. | Range 140 to 160 | 3 runs |
| TEST #4 - ½ Cup Skimmed Milk | | | |
| Average time | 2 min-10 sec. | Range 2'05" to 2/15" | 3 runs |
| Average froth | 350 ML. | Range320 to 380 | 3 runs |
| Average milk | 65 ML. | Range 50.to 80 | 3 runs |

In the preceding detailed description, the invention is described with reference to specific embodiments thereof. It will, however, be evident that various modifications and changes may be made thereto without departing from the broader scope of subject matter as set out in each claimed term. For example, frothing a liquid such as milk includes mixing, foaming, bubbling, lathering, creaming, stirring, effervescing, blending, fizzing, and spuming the milk. The liquid frothed may be adapted to be taken into the body by the mouth for digestion or absorption or be a substance not meant for consumption. The frother may be automatic or manually operated such as by a handle coupled to the gear train. Moreover, the frother may be run continuously to generate a continuous stream of froth. The written and drawing specification is, accordingly, to be regarded in an illustrative rather than a restrictive sense.

What is claimed is:

1. An apparatus to heat and froth milk, comprising:
    a container having a bottom;
    a lower paddle group disposed above the container bottom and having a first plurality of paddles;
    an upper paddle group disposed above the lower paddle group and having a second plurality of paddles;
    wherein each of said first and second plurality of paddles has a frame and a mesh disposed within the frame, said mesh having holes sized to enable frothed milk to be produced;
    means for counter rotating the lower paddle group with respect to the upper paddle group;
    wherein the means for counter rotating is disposed within a lower housing assembly removably coupled to the container and includes a motor coupled to a gear train, the gear train coupled to the lower paddle group and the upper paddle group and constructed so that the upper paddle group and lower paddle group rotate in opposite directions when power is supplied to the motor;
    a heater disposed within the lower housing assembly.

2. The apparatus of claim 1, the heater having an on and an off position, the apparatus further comprising:
    means for detecting a temperature above the container bottom and for automatically placing the heater in the off position after detecting a predetermined temperature, wherein the means for detecting is disposed against and below the container bottom.

3. The apparatus of claim 2 further comprising:
    a mounting spring having a plurality of arms wherein the heater is disposed between the mounting spring and the container bottom and wherein the means for detecting and for automatically placing is coupled to one arm.

4. The apparatus of claim 2, wherein the means for detecting and for automatically placing is an automatic switch that is a thermostat.

5. The apparatus of claim 2, further comprising:
    a means for sealing disposed between each of said first and second plurality of paddles and an inside wall of the container wherein the means for sealing is a spring loaded mesh disposed on an end of each of said plurality of paddles.

6. The apparatus of claim 2, wherein the means for counter rotating further comprises:
    a power cord coupled to a relay, said motor coupled between the relay and the gear train, an on/off switch electrically coupled to the power cord, and a power indication light electrically coupled to the on/off switch.

7. The apparatus of claim 1, wherein at least one paddle of said first and second plurality of paddles is disposed at an angle with respect to a direction of rotation of that paddle.

8. The apparatus of claim 7, wherein the angle is fifteen degrees.

9. The apparatus of claim 1, wherein the heater includes a high resistance wire disposed within an insulating material and wherein the insulating material is disposed within a hollow tube that defines a circular shape.

10. The apparatus of claim 9, wherein the container bottom includes a heater well that rises above a plane of the container bottom and wherein the heater is disposed inside the heater well, adjacent to and below the container bottom.

11. The apparatus of claim 1, wherein the means for counter rotating the lower paddle group with respect to the upper paddle group is adapted to rotate the lower and upper paddle groups at 400 to 600 revolutions per minute.

12. The apparatus of claim 1, wherein said mesh is formed using stainless steel.

13. A frother for frothing liquids, comprising:

a container having a longitudinal axis;

means for rotating located adjacent to the container;

a lower lead paddle coupled to the means for rotating, the lower lead paddle having material removed to define a plurality of holes;

an upper lead paddle coupled to the means for rotating, wherein rotation of the lower lead paddle and upper lead paddle is within the housing about the longitudinal axis;

a lower follow paddle coupled to the lower lead paddle to define a lower paddle group;

an upper follow paddle coupled to the upper lead paddle to define an upper paddle group;

the lower follow paddle having material removed to define a plurality of holes, the lower paddle group having a first rotated position and a second rotated position, wherein the upper paddle group is fixed in a position with respect to the first rotated position and the second rotated position;

wherein each of the plurality of holes defines a mesh;

wherein each mesh is a group of open spaces wherein each open space is surrounded by material, the material having at least a first length and each open space having at least a first length wherein the ratio of the first length of the material and the first length of an open space is one to one;

each open space having a center, wherein each open space measures 1/32 inch in a first direction and 1/32 inch in a second direction, and wherein the center of each open space is located at a distance of 1/16 inch from the centers of adjacent open spaces, and further wherein the means for rotating is disposed within a lower housing assembly coupled to the container having a longitudinal axis, the means for rotating having a power cord coupled to a relay, a motor coupled between the relay and a gear train, the gear train coupled to the lower paddle group and the upper paddle group, the means for rotating further having an on/off switch electrically coupled to the power cord, and a power indication light electrically coupled to the on/off switch.

14. The frother of claim 13, each open space having a perimeter, wherein each perimeter of each open space is circular, wherein each paddle resides at an angle of fifteen degrees with respect to the longitudinal axis, and the upper paddle group and the lower paddle group are adapted to rotate about the longitudinal axis along a circular path, and further wherein the gear train includes a drive pinion coupled between a drive gear of a dual gear and the motor, an upper paddle group drive coupled to a bevel gear of the dual gear at a first location, a lower paddle group drive coupled to the bevel gear at a second location, wherein the second location opposes the first location.

15. The frother of claim 13, wherein the upper lead paddle has material removed to define a plurality of holes, the upper follow paddle has material removed to define a plurality of holes, wherein the lower paddle group is adapted to rotate in a direction that is opposite of the direction of rotation of the upper paddle group.

16. The frother of claim 15, each open space having a perimeter, wherein each perimeter of each open space is circular, wherein each paddle resides at an angle of fifteen degrees with respect to the longitudinal axis, and the upper paddle group and the lower paddle group are adapted to rotate about the longitudinal axis along a circular path, and further wherein the gear train includes a drive pinion coupled between a drive gear of a dual gear and the motor, an upper paddle group drive coupled to a bevel gear of the dual gear at a first location, a lower paddle group drive coupled to the bevel gear at a second location, wherein the second location opposes the first location.

17. The frother of claim 15, wherein the container has an inside wall, and a first, second, third, and fourth means for sealing, each paddle having one means for sealing disposed between that paddle and the inside wall of the container.

18. The frother of claim 17, wherein the container has an exterior bottom and the means for sealing is a spring loaded mesh disposed on an end of a paddle, the frother further comprising:

a heater coupled to the exterior bottom of the container.

19. The frother of claim 15, wherein the motor has a rotational direction and a means for changing the rotational direction of the motor after a predetermined period of time.

20. The frother of claim 19 wherein the means for changing is a manual switch.

21. The frother of claim 19 wherein the means for changing is a computer chip programmed to change the motor directions as a function of at least one of time and pressure against the lower lead paddle.

22. The frother of claim 21 wherein the rotational direction of the motor is reversed at a point within each sequential time interval of ten and forty seconds.

23. The frother of claim 22 wherein the rotational direction of the motor is reversed after each twenty seconds.

24. An automatic beverage frother, comprising:

a lower housing assembly having a power cord coupled to a relay, the lower housing assembly further having a motor coupled to a gear train, an on/off switch electrically coupled to the power cord, and a power indication light electrically coupled to the on/off switch; and a container assembly coupled to the lower housing assembly, the container assembly including a handle attached to an exterior location on the container, a lid removably coupled to an exterior location on the container, a port cap removeably disposed within the lid, a flavor hatch coupled to the port cap, an upper paddle group coupled to the gear train, a lower paddle group coupled to the gear train, a heater coupled to the power cord, and a thermostat coupled to the power cord.

25. The automatic beverage frother of claim 24, the container assembly removeably coupled to the lower housing assembly, wherein the gear train includes a drive pinion coupled between a drive gear of a dual gear and the motor, an upper paddle group drive coupled to a bevel gear of the dual gear at a first location, a lower paddle group drive coupled to the bevel gear at a second location, wherein the second location opposes the first location, wherein the upper paddle group is removeably coupled to the upper paddle group drive, the lower paddle group is removeably coupled to the lower paddle group drive, the heater is removeably coupled to the power cord, and the thermostat is removeably coupled to the power cord.

* * * * *